United States Patent
Berenbaum et al.

(10) Patent No.: US 6,404,782 B1
(45) Date of Patent: Jun. 11, 2002

(54) METHOD AND APPARATUS FOR SIGNALING OVER PACKET-BASED SYSTEMS

(75) Inventors: Alan David Berenbaum, New York, NY (US); Robert Brian Dianda, Naperville, IL (US); Hubert Rae McLellan, Jr., Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/157,825

(22) Filed: Sep. 21, 1998

(51) Int. Cl.[7] .............................. H04J 3/12; H04L 12/66; H04L 12/56; H04M 11/00
(52) U.S. Cl. .................. 370/522; 370/352; 370/395.61; 379/90.01; 379/93.09
(58) Field of Search ................................ 370/352, 395.1, 370/395.61, 395.2, 901–902, 905, 904, 522, 523–524, 528; 379/90.01, 207.16, 93.01, 93.09, 207.05, 207.06, 207.07, 207.08

(56) References Cited

U.S. PATENT DOCUMENTS

| 5,477,538 A | * | 12/1995 | Huenlich | 370/395.31 |
| 5,719,863 A | * | 2/1998 | Hummel | 370/392 |
| 6,172,977 B1 | * | 1/2001 | Christie et al. | 370/395.61 |
| 6,272,128 B1 | * | 8/2001 | Pierson, Jr. | 370/395.61 |
| 6,324,179 B1 | * | 11/2001 | Doshi et al. | 370/395.61 |

OTHER PUBLICATIONS

ATM Forum, "ATM User–Network Interface Specification," Version 3.1, Sep. 1994.
ATM Forum, "Voice and Telephony Over ATM to the Desktop Specification," AF–VTOA 0083.000, May 1997.
Bellcore GR–303–CORE, IDLC Generic Requirements, Objectives and Interface, LDS–RDT Generic Interface—Requirements and Options, Issue 1, Revision 3, Dec. 1997.
T7630 Dual T1/E1 Short–Haul Terminator (Terminator–11), Lucent Technologies, Bell Labs Innovations, Oct. 1997.

* cited by examiner

Primary Examiner—Wellington Chin
Assistant Examiner—Maikhanh Tran
(74) Attorney, Agent, or Firm—Ryan, Mason & Lewis, LLP

(57) ABSTRACT

Signaling information is communicated over an ATM link or other packet-based communication link using packet headers. The information may be, for example, telephony signaling information such as an on-hook/off-hook indicator, a ring/no-ring indicator, or any other type of information used in establishing, maintaining, terminating or otherwise configuring a telephony-based communication. In an illustrative embodiment, a single bit of signaling information is incorporated into a low order bit of a packet type indicator field in a header of an ATM user data cell. This low order bit, which is generally used as an End of Message (EOM) indicator in a cell which is part of a multi-cell message, can be used to transmit the signaling information in packets corresponding to single-cell messages. For example, outbound telephony signaling information may be received from a telephony device such as a telephone or a computer modem, incorporated into an ATM cell header of a single-cell voice sample message, transmitted over an ATM link, removed from the header in an ATM processing device, and delivered to a public switched telephone network. In-bound telephony signaling information may be received from the public switched telephone network, incorporated into an ATM cell header of a single-cell voice sample message, transmitted over an ATM link, removed from the header in an ATM processing device, and delivered to a telephony device.

32 Claims, 2 Drawing Sheets

METHOD AND APPARATUS FOR SIGNALING OVER PACKET-BASED SYSTEMS

FIELD OF THE INVENTION

The present invention relates generally to asynchronous transfer mode (ATM) networks and other types of packet-based communication systems, and more particularly to techniques for transmitting voice and telephony information, as well as other types of information, over such systems.

BACKGROUND OF THE INVENTION

An ATM communication system provides high-speed, low-delay switching of voice, data, video and other types of user information traffic. In an ATM system, the user information traffic is separated into fixed-length 53-byte cells. Each ATM cell typically includes a 5-byte header and a 48-byte payload. The header incorporates a virtual channel identifier (VCI) and a virtual path identifier (VPI) associated with the corresponding cell. The VCI and VPI together specify a virtual connection (VC) which is established when a user requests a network connection in the ATM system. Additional details regarding these and other aspects of ATM systems can be found in the ATM Forum, "ATM User-Network Interface Specification," Version 3.1, September, 1994, and in Martin de Prycker, "Asynchronous Transfer Mode: Solution for Broadband ISDN," Ellis Horwood, New York, 1993.

Communication between an ATM layer and upper layer devices, such as ATM Adaptation Layer (AAL) devices, is specified in the above-cited User-Network Interface (UNI) reference. In a conventional system for transmitting voice and telephony over ATM (VTOA), voice samples are transmitted in ATM cell payloads, while a separate well-known ATM channel, i.e., a channel designated by VCI =5 and VPI =0, is used as a default channel to transmit the corresponding telephony signaling information. This telephony signaling information may include, for example, on-hook/off-hook and ring/no-ring indicators. The ATM Forum, "Voice and Telephony Over ATM to the Desktop Specification," AF-VTOA 0083.000, May 1997, specifies the use of the default channel for transmitting telephony signaling information in VTOA applications, and the above-cited UNI reference specifies that this default channel is the VCI =5, VPI =0 channel.

The above-noted default signaling channel generally serves as a common signaling channel for multiple users accessing the same connection end points. As a result, the signaling channel can easily become overloaded, leading to a bottleneck in transmission of VTOA. In addition, the telephony signaling information in the conventional signaling channel generally must be examined by intermediate switching elements in the connection path, even though the telephony signaling information is typically only required by the connection end points. This unnecessary processing can lead to further performance degradations. Existing techniques for transmitting VTOA thus fail to provide simple and efficient transmission of telephony signaling information over the ATM layer, and can significantly undermine the performance of voice and telephony applications in ATM or other packet-based systems.

SUMMARY OF THE INVENTION

The invention uses packet headers in an ATM or other packet-based communication system to transmit signaling information. In an illustrative embodiment of the invention, telephony signaling information, such as an on-hook/off-hook indicator, a ring/no-ring indicator, or any other type of information used in establishing, maintaining, terminating or otherwise configuring a telephony-based communication, is communicated over an ATM link using ATM cell headers. For example, a single bit of telephony signaling information may be incorporated into a low order bit, i.e., a least significant bit (LSB) of a packet type indicator (PTI) field in a header of an ATM user data cell. Such an arrangement is possible because voice samples associated with the telephony-based communication are generally single-cell messages, such that the LSB portion of the PTI field in the header, which could be used to indicate an End of Message (EOM) cell in a multi-cell message, can instead be used to transmit the signaling information. Other embodiments of the invention may utilize, for example, a cell loss priority (CLP) bit in the cell header to transmit signaling information in applications in which the CLP bit is end-to-end unmodified for a given connection. The CLP bit may be used in conjunction with the LSB of the PTI field to provide a multi-bit signaling channel, or may be used to provide a separate signaling channel independently of the PTI field.

In embodiments of the invention in which the transmitted signaling information is telephony signaling information, out-bound telephony signaling information received from a telephony device such as a telephone or a computer modem is incorporated into an ATM cell header, transmitted with the cell over an ATM link, removed from the header in an ATM processing device, and delivered to a public switched telephone network (PSTN). In-bound telephony signaling information received from the PSTN is incorporated into an ATM cell header, transmitted with the cell over an ATM link, removed from the header in an ATM processing device, and delivered to the telephony device. The ATM processing devices may be implemented, for example, as telephony-to-ATM converters or suitable interworking functions, and may be incorporated into switches, PBXs, or other elements associated with a packet-based communication system.

Although particularly well suited for use in transmission of telephony signaling information over ATM systems, the invention may also be implemented in other types of packet-based communication systems, using other types of signaling information, and with a wide variety of different system configurations. Advantageously, the invention can transmit signaling information in a simple and efficient manner, without interfering with the conventional functions of the header. These and other features and advantages of the present invention will become more apparent from the accompanying drawings and the following detailed description.

DETAILED DESCRIPTION OF THE INVENTION

The present invention will be illustrated below in conjunction with exemplary ATM processing hardware. It should be understood, however, that the disclosed techniques are suitable for use with a wide variety of other types of packet-based systems including, for example, Frame Relay systems and Voice-over-IP systems. The term "packet" as used herein is intended to include not only ATM cells but also other types of packets used in other packet-based communication systems. The terms "voice and telephony" and "voice and telephony service" as used herein are intended to include, for example, compressed or uncompressed voice or other audio data, facsimile and other types of data transmitted over a voice channel, telephony signaling, as well as other types of voice-related or telephony-related communications. The term "voice" as used herein is intended to include human-generated audio information, machine-generated audio information or combinations of these and other types of audio information. The term "signaling information" is intended to include any type of information which can be communicated in a packet header but would otherwise generally be transmitted separately from the corresponding packet payload. The term "telephony signaling information" is intended to include, e.g., on-hook/off-hook indicators, ring/no-ring indicators, or any other type of information used in establishing, maintaining, terminating or otherwise configuring a telephony-based communication. The term "processing device" is intended to include a computer, a microprocessor, an application-specific integrated circuit (ASIC), or any other device which processes packets in a packet-based communication system. An ATM device is one example of a processing device, but the term "processing device" as used herein may also refer, e.g., to a portion of an ATM device, or to a system element which incorporates an ATM device. The term "telephony device" is intended to include a telephone, a computer, a computer modem, or any other device for generating, receiving or otherwise processing telephony signaling information.

Figure 1:
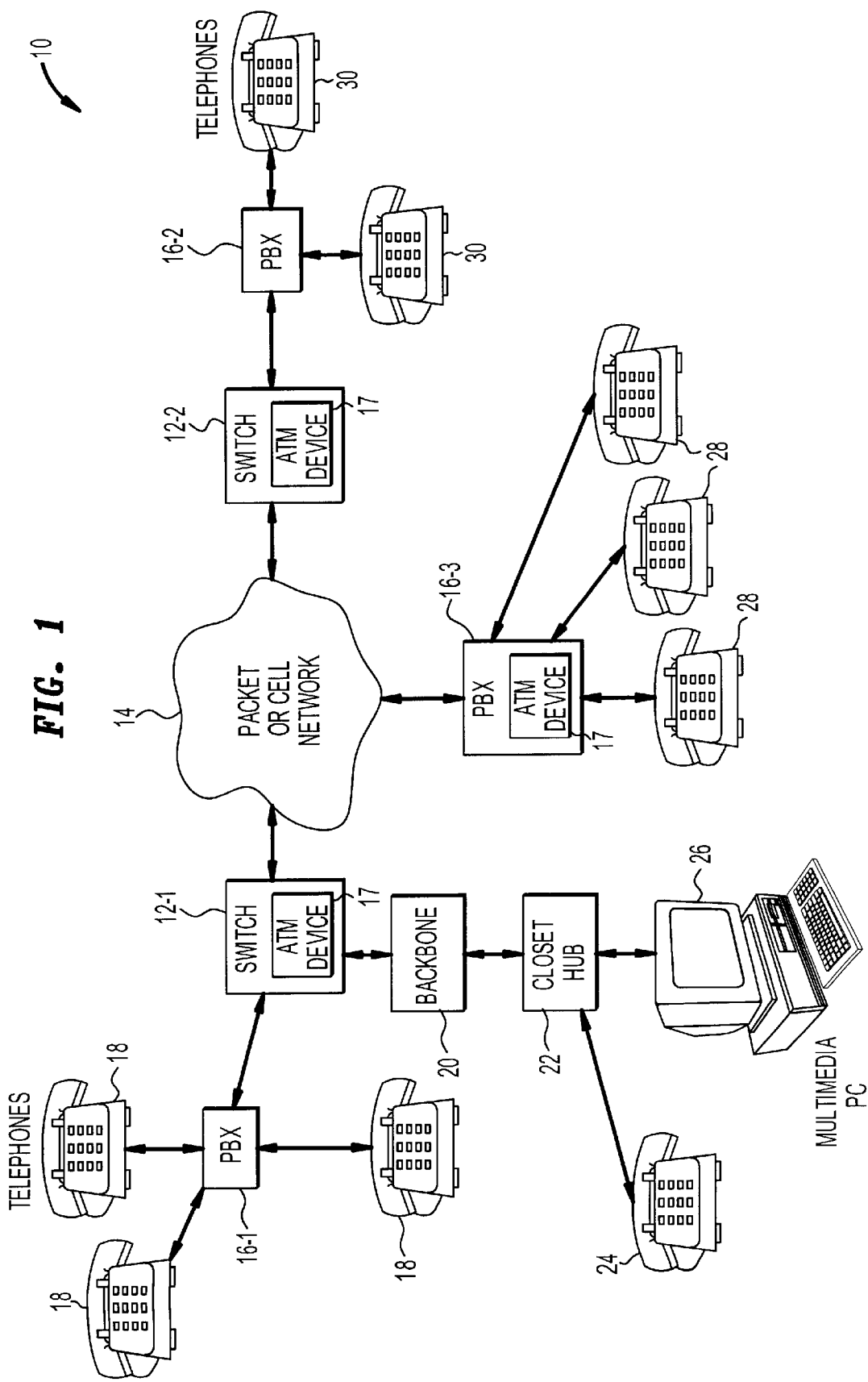
FIG. 1 is a block diagram of an exemplary packet-based communication system in which the invention may be implemented.

FIG. 1 shows a packet-based communication system 10 in which the invention may be implemented. The system 10 includes first and second call processing devices 12-1, 12-2, one or both of which may be an enterprise switch of a business, a carrier edge switch of a service provider, or other like device, e.g., an access concentrator, PBX, access multiplexer device or Subscriber Loop Carrier (SLC) system. The call processing devices 12-1 and 12-2 are connected to communicate over a packet or cell network 14, which may be, e.g., an ATM network. The system 10 further includes three private branch exchange (PBX) switches 16-1, 16-2 and 16-3. The PBX switches 16-1 and 16-2 are connected to call processing devices 12-1 and 12-2, respectively, and PBX 16-3 is connected to network 14. Call processing devices 12-1 and 12-2 and PBX 16-3 are each configured to include an ATM device 17. Each of the ATM devices 17 may include, e.g., an ATM receiver, an ATM transmitter, or both, as well as other transmission and reception devices for, e.g., ATM Adaptation Layer (AAL) and physical layer devices.

The system 10 supports voice and telephony services using certain conventional devices, such as telephones and computers. For example, the PBX switch 16-1 is connected to telephones 18. The call processing device 12-1 is connected via a backbone 20 to a closet hub 22 which in turn provides connection to a telephone 24 and a multimedia personal computer (PC) 26. The PBX switch 16-3 is connected to telephones 28, and the PBX switch 16-2 connected to call processing device 12-2 is in turn connected to telephones 30. The conventional aspects of the operation of these devices are well understood in the art and therefore not described in detail herein.

The ATM devices 17 are used to communicate voice and telephony information via, e.g., an ATM connection established through the network 14. The call processing devices 12-1 and 12-2 and the PBX 16-3 may each represent different geographic locations in system 10, with all inter-location voice and telephony traffic transported by way of the ATM devices 17 and the network 14. Of course, numerous alternative configurations are possible for system 10, e.g., using elements other than those shown in FIG. 1, and it should be understood that the invention is not restricted to use with any particular system configuration. It should also be noted that the invention is applicable to any type of ATM connection, as well as to similar types of connections in other packet-based systems.

Figure 2:
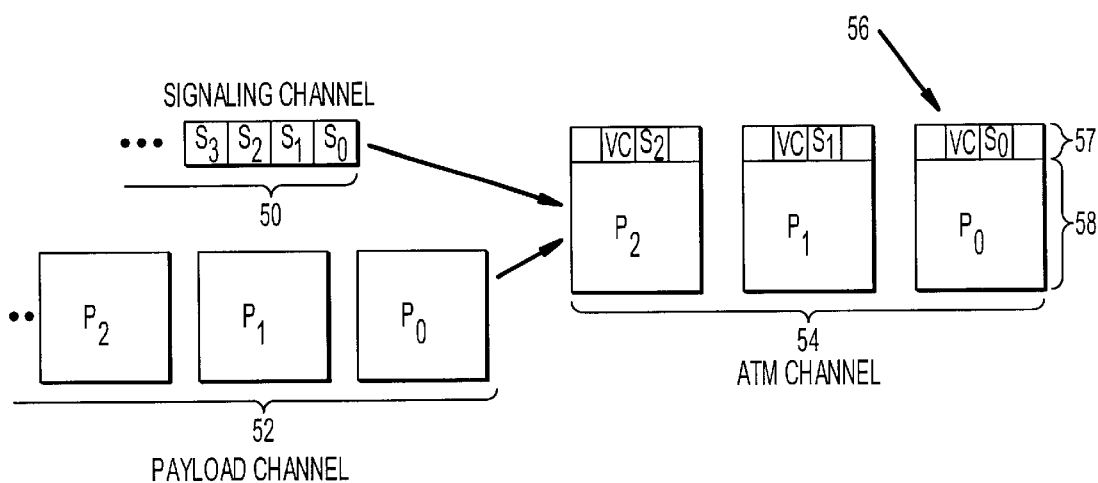
FIG. 2 illustrates the manner in which a signaling channel and a payload channel can be combined using the techniques of the invention.

The present invention provides techniques for transmitting signaling information, such as telephony-related signaling information, over ATM connections such as those described in conjunction with FIG. 1. FIG. 2 illustrates the manner in which information associated with a signaling channel 50 may be combined with information from a payload channel 52 to form an ATM channel 54 in an illustrative embodiment of the invention. The signaling channel 50 includes signaling information $S_0, \ldots S_1, S_N$, which may be, e.g., single-bit indications of on-hook/off-hook and ring/no-ring conditions for calls to be placed over an ATM network. The signaling channel may be, for example, the default signaling channel as specified in the above-cited ATM Forum reference, "ATM User-Network Interface Specification," Version 3.1. As noted above, the signaling information may be any type of telephony signaling information used in establishing, maintaining, terminating or otherwise configuring a telephony-based communication. The signaling information may be generated, e.g., by telephones, PBXs, switches or other elements of the system of FIG. 1. Other types of telephony signaling information in accordance with the invention include, e.g., the ABCD codes for locally switched circuits as described in Bellcore GR-303-CORE, IDLC Generic Requirements, Objectives and Interface, LDS-RDT Generic Interface—Requirements and Options, Issue 1, Revision 3, December 1997, which is incorporated by reference herein. The payload channel 52 includes payload information $P_0, P_1, \ldots P_M$ which may be, e.g., voice samples generated by a voice and telephony service physical layer device associated with an element of the system of FIG. 1. It should be noted that the signaling information $S_0, S_1, \ldots S_N$ need not be telephony signaling information, but could instead be any type of information which would ordinarily be transmitted separately from the payload information.

In accordance with the invention, the signaling information $S_0, \ldots S_N$ is combined with the payload information $P_0, P_1, \ldots P_M$, to form ATM channel 54, which may represent an ATM connection established through a network such as network 14 of FIG. 1. The ATM channel 54 includes a number of ATM cells 56, each including a header 57 and a payload 58. Each of the headers 57 includes a virtual connection (VC) which, as previously noted, is specified by a virtual channel identifier (VCI) and a virtual path identifier (VPI). The signaling information $S_0$ is placed in the header of the cell containing payload information $P_0$. Similarly, the signaling information $S_1$ is placed in the header of the cell containing payload information $P_0$, the signaling information $S_2$ is placed in the header of the cell containing payload information $P_2$, and so on.

Figure 3:
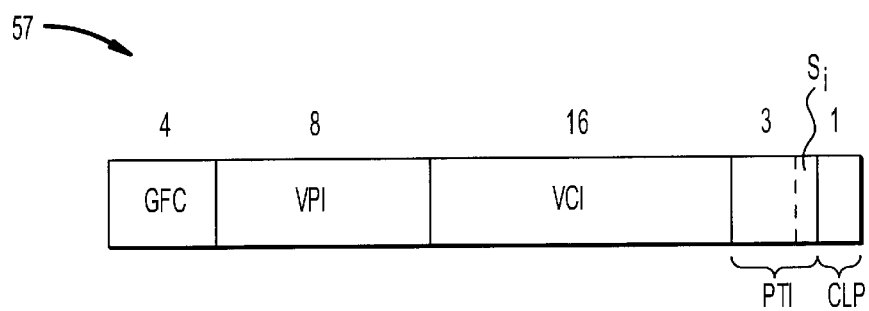
FIG. 3 shows an ATM cell header incorporating signaling information in accordance with the invention.

FIG. 3 shows a more detailed view of an exemplary ATM cell header 57 with signaling information $S_1$ incorporated therein in accordance with the invention. The header 57 includes a 4-bit General Flow Control (GFC) field, an 8-bit VPI field, a 16-bit VCI field, a 3-bit Payload Type Indicator (PTI) field, and a one-bit Cell Loss Priority (CLP) field. The conventional functions of these fields are described in greater detail in the above-cited "ATM Forum reference, ATM User-Network Interface Specification, Version 3.1. The PTI field is generally used to discriminate between user cells, i.e., cells carrying user information, and non-user cells. TABLE 1 below illustrates the conventional functions of the PTI field. Certain information in TABLE 1, such as Operations and Maintenance (OAM) and flow 5 (F5), is described in greater detail in ITU Standard 1.610, "B-ISDN Operation and Maintenance Principles and Functions," which is incorporated by reference herein.

TABLE 1

| PTI Coding (MSB First) | Interpretation |
| --- | --- |
| 000 | User data cell, congestion not experienced, SDU-type = 0 |
| 001 | User data cell, congestion not experienced, SDU-type = 1 |
| 010 | User data cell, congestion experienced, SDU-type = 0 |
| 011 | User data cell, congestion experienced, SDU-type = 1 |
| 100 | Segment OAM F5 flow related cell |
| 101 | End-to-end OAM F5 flow related cell |
| 110 | Reserved for future traffic control and resource management |
| 111 | Reserved for future functions |

The present invention, in the illustrative embodiment, uses a portion of the PTI field of user data cells to convey the signaling information $S_0, S_1, \ldots S_N$. For example, as described in the above-cited ATM Forum reference, a portion of the PTI field, i.e., the least significant bit (LSB), specifies a Service Data Unit (SDU) type. For applications using ATM Adaptation Layer 5 (AAL5), the SDU type is used to indicate an End of Message (EOM) cell in a multi-cell message. Since voice sample cells are generally single-cell messages, the SDU type bit is not needed as an EOM indicator. This bit of the PTI field of user data cells can therefore be used, in accordance with the invention, to convey the signaling information $S_0, S_1, \ldots S_N$. For example, as shown in TABLE 1, PTI values of 000, 001, 010 and 011 in a conventional system indicate user data cells, with the LSB indicating the SDU type. The illustrative embodiment instead uses the LSB of the PTI field to convey a single bit of signaling information along with each ATM cell. Advantageously, the PTI field can still provide the function of discriminating between user cells and non-user cells, while also conveying the signaling information. The illustrative embodiment of the invention thus incorporates signaling information into headers of packets which contain single-cell messages, using a portion of the headers which would otherwise serve a different function, e.g., an EOM indication function, if the packets were part of a multi-cell message.

Figure 4:
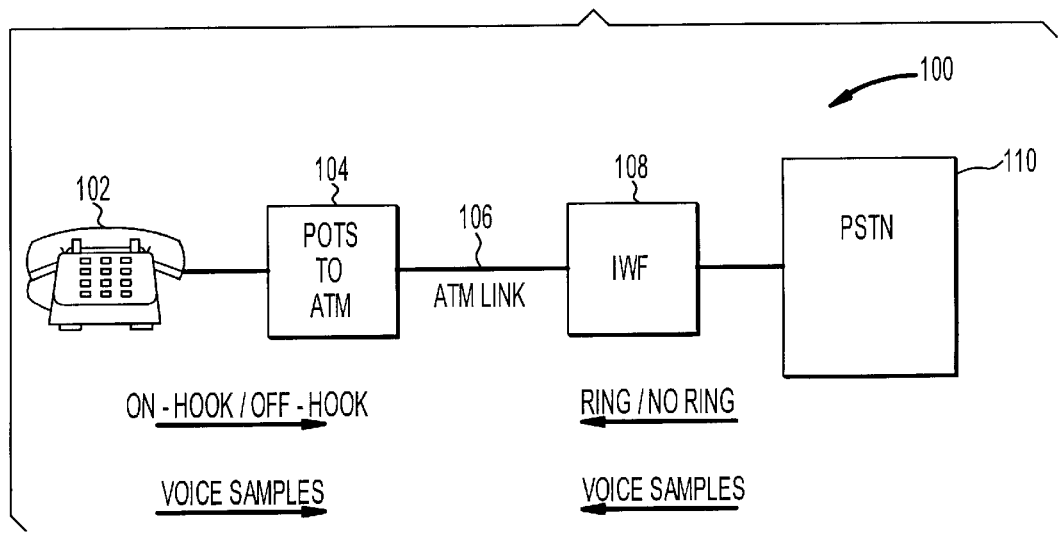
FIG. 4 illustrates the manner in which telephony signaling information can be transmitted over an ATM link using the techniques of the invention.

FIG. 4 shows an exemplary system 100 in which telephony signaling information is transmitted in an ATM cell header in the manner previously described. The system 100, which may represent a portion of the system 10 of FIG. 1, includes a telephone 100, a plain old telephone service (POTS)-to-ATM converter 104, an ATM link 106, an interworking function (IWF) 108, and a public switched telephone network 10. The telephone 102 may be, e.g., one of the telephones 18, 24, 28 or 30 of FIG. 1. The POTS-to-ATM converter 104 and IWF 108 may each be, e.g., an element of the switch 12-1, the switch 12-2, or the PBX 16-3, and each may incorporate an ATM device 17 for converting voice samples and telephony signaling information into ATM cells and vice-versa. The ATM link 106 may be, e.g., one or more ATM connections established through the network 14. The PSTN 110 may include, e.g., elements such as the switches 12-1 and 12-2, or portions or combinations thereof.

As shown in FIG. 4, out-bound signaling information such as on-hook/off-hook indicators from telephone 102 are passed to the PSTN via the POTS-to-ATM converter 104, the ATM link 106 and the IWF 108. For example, a given bit of out-bound signaling information $S_1$ corresponding to an on-hook/off-hook indicator from telephone 102 may be incorporated into an ATM cell header in POTS-to-ATM converter 104, and passed with the cell over the ATM link 106. The IWF 108 receives the cell and removes the bit of signaling information $S_1$ from the cell and passes it to the PSTN 110, such that PSTN 110 is made aware of the on-hook/off-hook status of the telephone 102. In-bound signaling information such as a ring/no-ring indicator passes from the PSTN 110 to the telephone 102 via the IWF 108, the ATM link 106 and the POTS-to-ATM converter 104. For example, a given bit of signaling information $S_1$ corresponding to a ring/no-ring indicator from PSTN 110 may be incorporated into an ATM cell header in IWF 108, and passed with the cell over the ATM link 106. The POTS-to-ATM converter 104 receives the cell and removes the bit of signaling information $S_1$, from the cell and passes it to the telephone 102, such that telephone 102 is made aware of the ring/no-ring status of the corresponding line in the PSTN 110. Voice samples pass in both directions between telephone 102 and PSTN 110 via the ATM link 106. These voice samples are incorporated into ATM cell payloads in a conventional manner.

The above-described embodiments of the invention are intended to be illustrative only. In alternative embodiments, other fields of a cell or packet header may be used to communicate signaling information. For example, a cell loss priority (CLP) bit in an ATM cell header may be used in certain cases to transmit signaling information in accordance with the invention. The ATM Forum UNI 4.0 and Traffic Management (TM) 4.0 specifications define certain traffic types for which the CLP bit is transported end-to-end unmodified for a given connection, and is thus not used to indicate cell loss or to provide any other function. These traffic types include CBR.1 (Constant Bit Rate) and VBR.1 (Variable Bit Rate). The CLP bit in these cases could therefore be used to provide a second bit for the signaling channel of the PTI-based embodiment described above, or could be used as a separate signaling channel.

It should also be noted that the invention may be applied to other types of packets, other types of signaling information, other types of ATM transmission and reception devices, and other; types of packet-based communication systems, in a wide variety of alternative system implementations. For example, although the illustrative embodiment incorporates a single bit of signaling information into each cell header, multiple bits of signaling information could b incorporated into each header in alternative embodiments. These and numerous other embodiments within the scope of the following claims will be apparent to those skilled in the art.

What is claimed is:

1. A method for communicating information in packets of a packet-based communication system, the method comprising the steps of:

receiving signaling information; and incorporating the signaling information into a header of a given one of the packets which contains a single-packet message, wherein the signaling information is incorporated into a portion of the header which serves a different function if the packet is a part of a multi-cell message.

2. The method of claim 1 wherein the signaling information is telephony signaling information.

3. The method of claim 1 wherein the packet-based communication system is an Asynchronous Transfer Mode (ATM) communication system.

4. The method of claim 2 further including the step of incorporating voice samples corresponding to the telephony signaling information into a payload portion of the given one of the packets.

5. The method of claim 1 wherein the step of incorporating signaling information into a header further includes incorporating at least one bit of signaling information in a header of each of a plurality of the packets.

6. The method of claim 2 wherein the step of incorporating signaling information into a header further includes incorporating an on-hook/off-hook indicator into the header.

7. The method of claim 2 wherein the step of incorporating signaling information into a header further includes incorporating a ring/no-ring indicator into the header.

8. The method of claim 2 wherein the step of incorporating signaling information into a header further includes incorporating the telephony signaling information into a single bit of a payload type indicator field of the header.

9. The method of claim 8 wherein the step of incorporating signaling information into a header further includes incorporating the information into the payload type indicator field of the header if the packet is designated as a user data packet.

10. The method of claim 1 wherein the receiving step includes receiving the signaling information from a telephony device associated with a user of the system.

11. The method of claim 1 wherein the receiving step includes receiving the signaling information from a telephone network.

12. The method of claim 1 further including the step of transmitting the packet through at least a portion of the system.

13. An apparatus for communicating information in packets of a packet-based communication system, the apparatus comprising:

a processing device operative to receive signaling information, and to incorporate the signaling information into a header of a given one of the packets which contains a single-packet message, wherein the signaling information is incorporated into a portion of the header which serves a different function if the packet is a part of a multi-cell message.

14. The apparatus of claim 13 wherein the signaling information is telephony signaling information.

15. The apparatus of claim 13 wherein the packet-based communication system is an Asynchronous Transfer Mode (ATM) communication system.

16. The apparatus of claim 13 wherein the processing device is further operative to incorporate voice samples corresponding to the signaling information into a payload portion of the given one of the packets.

17. The apparatus of claim 13 wherein the processing device is further operative to incorporate at least one bit of signaling information in a header of each of a plurality of the packets.

18. The apparatus of claim 14 wherein the telephony signaling information includes an on-hook/off-hook indicator.

19. The apparatus of claim 14 wherein the telephony signaling information includes a ring/no-ring indicator.

20. The apparatus of claim 15 wherein the processing device is further operative to incorporate the signaling information into a single bit of a payload type indicator field of the header.

21. The apparatus of claim 20 wherein the processing device incorporates the signaling information into the payload type indicator field of the header if the packet is designated as a user data packet.

22. The apparatus of claim 13 wherein the processing device receives the signaling information from one of: (i) a telephony device associated with a user of the system, and (ii) a telephone network.

23. The apparatus of claim 13 wherein the processing device is further operative to transmit the packet through at least a portion of the system.

24. The apparatus of claim 13 wherein the processing device includes at least one of an interworking function and a telephony-to-packet converter.

25. A method for communicating information in packets of a packet-based communication system, the method comprising the steps of:

receiving telephony signaling information; and incorporating the telephony signaling information into a header of a given one of the packets.

26. An apparatus for communicating information in packets of a packet-based communication system, the apparatus comprising:

a processing device operative to receive telephony signaling information, and to incorporate the telephony signaling information into a header of a given one of the packets.

27. A method for communicating information in packets of a packet-based communication system, the method comprising the steps of:

receiving signaling information; and incorporating the signaling information into a portion of a header of a given one of the packets, wherein the portion of the header would otherwise be end-to-end unmodified for a corresponding connection.

28. The method of claim 27 wherein the portion of the header includes a cell loss priority bit of the header.

29. The method of claim 27 wherein the portion of the header includes at least one bit of a payload type indicator field of the header.

30. An apparatus for communicating information in packets of a packet-based communication system, the apparatus comprising:

a processing device operative to receive signaling information, and to incorporate the signaling information into a portion of a header of a given one of the packets, wherein the portion of the header would otherwise be end-to-end unmodified for a corresponding connection.

31. The apparatus of claim 30 wherein the portion of the header includes a cell loss priority bit of the header.

32. The apparatus of claim 30 wherein the portion of the header includes at least one bit of a payload type indicator field of the header.

* * * * *